United States Patent
Zhang et al.

(10) Patent No.: US 8,456,354 B2
(45) Date of Patent: Jun. 4, 2013

(54) SYSTEM AND METHOD FOR APPLYING AUGMENTATION CORRECTIONS FOR GNSS POSITIONING

(75) Inventors: Yufeng Zhang, Calgary (CA); Yang Gao, Calgary (CA); Suen Lee, Calgary (CA)

(73) Assignee: Nexteq Navigation Corporation, Calgary, Alberta (CA)

( * ) Notice: Subject to any disclaimer, the term of this patent is extended or adjusted under 35 U.S.C. 154(b) by 129 days.

(21) Appl. No.: 12/954,651

(22) Filed: Nov. 25, 2010

(65) Prior Publication Data

US 2012/0050097 A1    Mar. 1, 2012

Related U.S. Application Data

(60) Provisional application No. 61/264,555, filed on Nov. 25, 2009.

(51) Int. Cl.
*G01S 19/43*     (2010.01)
*G01S 19/30*     (2010.01)

(52) U.S. Cl.
USPC .............................. 342/357.26; 342/357.69

(58) Field of Classification Search
USPC ............ 342/357.26–357.28, 357.68, 357.69; 701/468, 470
See application file for complete search history.

(56) References Cited

U.S. PATENT DOCUMENTS 7,911,378 B2 *    3/2011    Zhang et al. ............. 342/357.26

\* cited by examiner

*Primary Examiner* — Dao Phan
(74) *Attorney, Agent, or Firm* — Bennett Jones LLP

(57) ABSTRACT

A method for determining a position using a GNSS system having a plurality of GNSS satellites and one or more augmentation systems, which method includes the steps of obtaining a code or phase measurement from the GNSS satellite signals, generating measurement groups, and generating corrected measurement groups by applying code or phase corrections from the augmentation systems, and applying combinations of the corrected measurements in a filter which outputs a position and ambiguity estimate.

31 Claims, 5 Drawing Sheets

SYSTEM AND METHOD FOR APPLYING AUGMENTATION CORRECTIONS FOR GNSS POSITIONING

CROSS REFERENCE TO RELATED APPLICATIONS

This application claims the priority benefit of U.S. Provisional Patent Application No. 61/264,555 filed on Nov. 25, 2009 entitled "System and Method for Applying Augmentation Corrections for GNSS Positioning, the contents of which are incorporated herein by reference.

FIELD OF THE INVENTION

The present invention relates to positioning using a Global Navigation Satellite System and more particularly to correcting errors for code and phase measurements from a Global Navigation Satellite System to achieve a positioning result.

BACKGROUND

Global Navigation Satellite System (GNSS) is the commonly accepted term for positioning systems based on line of sight radio from orbiting satellites. GNSS positioning applies the simultaneous range to a minimum of four GNSS satellites from a receiver, along with the known satellite coordinates obtained from the broadcasted navigation messages, to determine the three dimensional coordinates of the receiver position and a receiver clock offset. Existing GNSSs include the Global Positioning System (GPS) funded and controlled by the U.S. Department of Defense, the GLObal NAvigation Satellite System (GLONASS) founded and controlled by Russia, the GALILEO system founded and controlled by Europe, the Beidou system founded and controlled by China and the Quasi-Zenith Satellite System (QZSS) founded and controlled by Japan.

For a typical GNSS system, the navigation satellites transmit two types of measurements; the code portion allowing a code pseudorange measurement to be determined and the carrier portion allowing a carrier phase measurement to be determined. The code pseudorange is an unambiguous measurement of distance to the satellite transmitting the signal, but with relatively poor measurement accuracy. The carrier phase measurement has better measurement accuracy, but always contains an ambiguity due to the unknown number of carrier wavelengths existing in the phase measurement.

However, since the signals being transmitted between the satellites and the receiver are subjected to numerous errors, such as satellite orbit and clock errors, atmospheric delay, environmental effects and the like, position determined even using the carrier portion is not completely accurate. Augmentation systems, which determine errors and provide corrections to code pseudorange measurements and carrier phase measurements, have been developed to mitigate these errors. The augmentation systems can be ground based or satellite based and some freely provide the corrections whereas others require a subscription in order to use the corrections. These augmentation systems include code pseudorange based augmentation systems such as the Wide Area Augmentation System (WAAS) covering North America, the European Geostationary Navigation Overlay System (EGNOS) covering Europe, the Multifunctional Transport Satellite Space bases Augmentation System (MSAS) covering East Asia, GPS Aided Geo Augmented Navigation (GAGAN) covering India, and local DGPS systems to provide code pseudorange corrections and carrier phase based systems, such as Omni-Star™, StarFire™ and CORS systems to provide carrier phase measurement corrections.

A typical existing GNSS receiver can apply code corrections or phase corrections from publicly available systems or privately owned systems. Code corrections generally offer less of an accuracy improvement as compared to phase corrections. However, phase correction based systems have a relatively longer initialization period, typically 20 to (30 minutes. There is a need in the art for methods and systems to optimally combine these two kinds of corrections in one receiver to achieve a positioning result that has the fast initialization of code corrections and the higher accuracy of phase corrections.

SUMMARY OF THE INVENTION

In one aspect, the invention may comprise a method for determining a position using a GNSS systems having a plurality of GNSS satellites and one or more augmentation systems, the method comprising the step of receiving signals transmitted by the GNSS satellites, and further comprising the sequential or non-sequential steps of:

a) obtaining a direct code or a direct phase measurement, or both, from the GNSS satellite signals;

b) generating a code measurement group by creating at least one code-based additional measurement;

c) generating a phase measurement group by creating at least one phase-based additional measurement;

d) generating an IFCP measurement group by creating at least one IFCP measurement;

e) receiving at least one code correction from a code based augmentation system, or at least one phase correction from a phase based augmentation system, or both;

f) correcting one or more:
   a. at least one measurement from the code measurement group with a code correction to produce a pure code (PC) measurement group, or with a phase correction to produce a mixed code (MC) measurement group, or producing both a PC and a MC measurement group, or
   b. at least one measurement from the phase measurement group with a phase correction to create a pure phase (PP) measurement group, or with a code correction to create a mixed phase (MP) measurement group, or producing both a PP and a MP measurement group, or
   c. at least one IFCP measurement with a phase correction to produce a pure code phase (PCP) measurement group, or with a code correction to produce a mixed code phase (MCP) measurement group, or producing both a PCP measurement group and a MCP measurement group, or
   d. correct errors by error models;

g) combining at least two different measurements selected from the measurement groups created in step (f) into code-dominated combinations and phase-dominated measurement combinations; and h) using one or more of a code-dominated combination in a filter which outputs a position and ambiguity estimate;

i) repeating steps (a)-(h) until a stable filter output is achieved; and j) thereafter using one or more of a phase-dominated combination in the filter.

In one embodiment, step (j) may optionally be omitted where step (h) may utilize any measurement combination except a single frequency combination combining a MC and a PP measurement, and steps (a) to (i) are repeated regardless of the filter status. In another embodiment, optionally steps (h) and (i) are omitted and a phase dominated combination is used in the filter, where step (h) may utilize any measurement combination except a dual frequency combination combining pure IF phase plus pure IFCP measurement, or mixed IF code plus pure IF phase measurement.

In another aspect, the invention may comprise a device for approximating a position using a GNSS system having a plurality of satellites and an augmentation system, the device comprising:

(a) at least one memory, the memory containing a set of program instructions;
(b) at least one processor operatively connected to the memory, the at least one processor responsive to the program instructions to:
  (i) obtain an initial direct code or an initial direct phase measurement, or both, from the GNSS satellite signals;
  (ii) generate a code measurement group by creating at least one code-based additional measurement;
  (iii) generate a phase measurement group by creating at least one phase-based additional measurement;
  (iv) generate an IFCP measurement group by creating at least one IFCP measurement;
  (v) receive at least one code correction from a code based augmentation system or at least one phase correction from a phase based augmentation system, or both;
  (vi) correct:
    a. at least one measurement from the code measurement group with a code correction or a phase correction, or both, to produce a pure code (PC) measurement group, or a mixed code (MC) measurement group, respectively, or
    b. at least one measurement from the phase measurement group with a phase correction or a code correction, or both, to create a pure phase (PP) measurement group, or a mixed phase (MP) measurement group, respectively, or
    c. at least one IFCP measurement with a phase correction or a code correction, or both, to produce a pure code phase (PCP) measurement group, or a mixed code phase (MCP) measurement group;
  (vii) combine at least two different measurements selected from the PC, MC, PP, MP, PCP and MCP groups created in step (f) into code-dominated combinations or phase-dominated measurement combinations, or both; and
  (viii) use one or more of a code-dominated combination or a phase-dominated combination, or both, in a filter which outputs a position and ambiguity estimate; and
  (ix) repeating steps (i)-(viii) until a stable filter output is achieved.

In alternative embodiments, the program instructions may be to alternative embodiments of the method as described or claimed herein.

DETAILED DESCRIPTION OF VARIOUS EMBODIMENTS

The invention relates to a system and method for using code and phase augmentation corrections in carrier phase based GNSS positioning. When describing the present invention, all terms not defined herein have their common art-recognized meanings. To the extent that the following description is of a specific embodiment or a particular use of the invention, it is intended to be illustrative only and not limiting of the claimed invention. The following description is intended to cover all alternatives, modifications and equivalents that are included in the spirit and scope of the invention, as defined in the appended claims.

Figure 1:
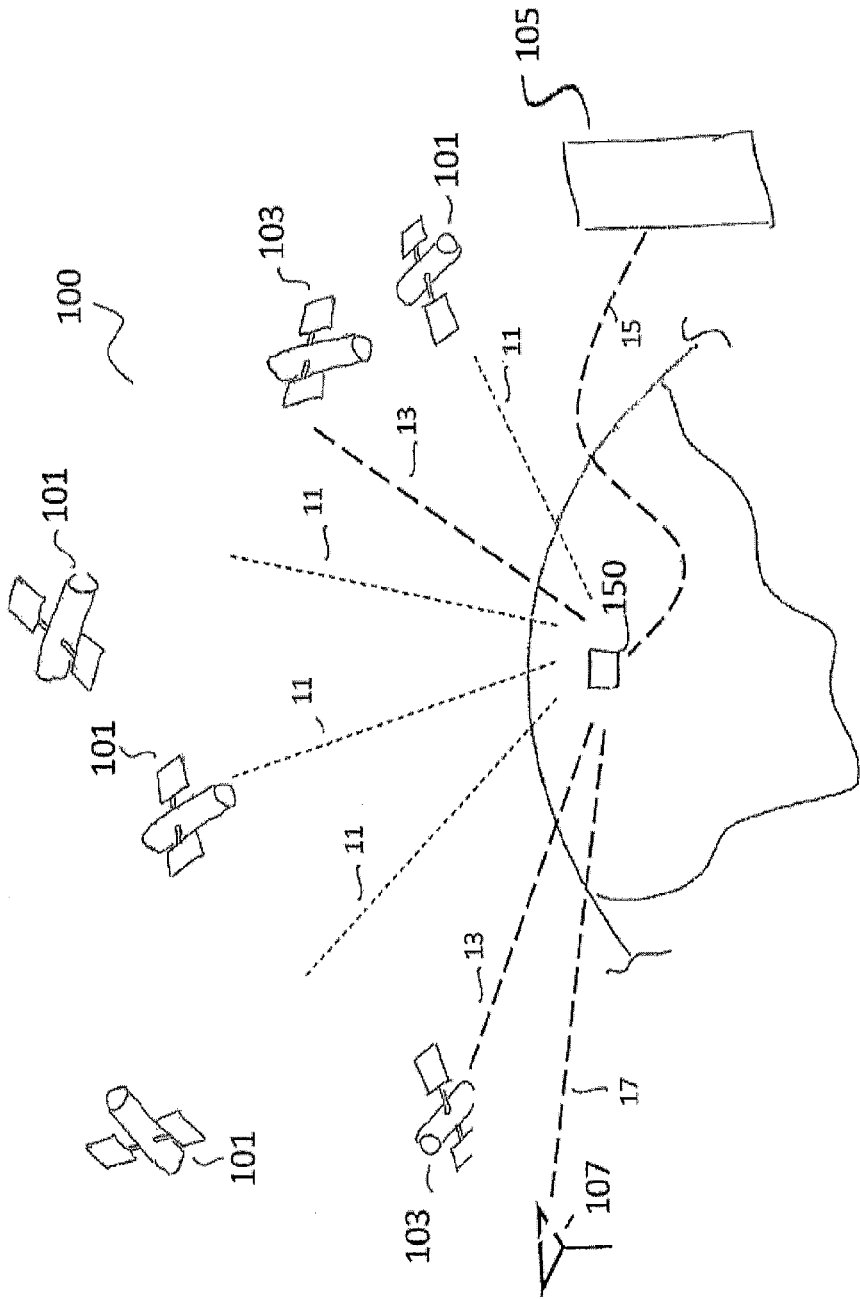
FIG. 1 is a representative illustration of a Global Navigation Satellite System (GNSS) with augmentation systems.

FIG. 1 illustrates a representative view of Global Navigation Satellite system (GNSS) (100) such as GPS, GLONASS, GALILEO, Chinese COMPASS or Japanese QZSS. The GNSS (100) includes a plurality of satellites (101) transmitting signals (11) that include a data stream providing information regarding the satellite (101) transmitting the signal (11), through single or multiple frequency carriers. A GNSS receiver (150) receives the signals from satellites (101) and determines the position of the receiver with measurements derived from the signals (11) from at least four satellites (101).

The GNSS receiver (150) is provided that is operative to receive the signals (11) transmitted by the plurality of satellites (101). Typically, the GNSS receiver must be in line of sight with a satellite to receive the signals transmitted by that satellite. The GNSS receiver can use the signals received from the satellites 12 to determine code pseudorange and carrier phase measurements. The present invention may be implemented with and/or incorporated into any GNSS or GPS device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, and the like. Any such device shall be considered a GNSS receiver herein.

It is noted that the clock in a GNSS receiver is not an atomic clock, and as such does not keep the time as precisely as the satellite clocks. Therefore, each distance measurement is corrected to account for the clock error in the GNSS receiver. This distance or range correction attributable to the clock error is termed a pseudorange. The code pseudorange measurement is the distance between one of the satellites that transmitted the signal and the antennas of the GNSS receiver. By determining the time shift needed to align a code portion of the signal received from one of the satellites with a code portion of the signal generated by the GNSS receiver, a code pseudorange measurement can be determined. Using the determined time shift and the speed of light, an unambiguous approximation of the distance between the satellite transmitting the signal and the GNSS receiver can be determined.

The carrier phase measurement uses the phase difference between a carrier portion of a received signal and an identical receiver-generated carrier signal to determine and even more accurately approximate the distance between the satellite transmitting the signal and the GNSS receiver.

The GNSS receiver can determine its position by triangulation using the transmitted signals of a number of the satellites (typically 4 or more) to determine approximate distances between the GNSS receiver and the various satellites using both code pseudorange measurements and carrier phase measurements.

Along with the plurality of satellites (101) and the GNSS receiver (150), the present invention utilizes augmentation systems. Based on the creation principle, the augmentation systems may comprise code based augmentation systems whose corrections are designed for correcting code measurements, and phase based augmentation systems whose corrections are designed for correcting phase measurement. Current code based augmentation systems include but are not limited to Satellite Based Augmentation System (SBAS) such as the Wide Area Augmentation System (WAAS) in use in the United States, Multi functional Satellite Augmentation System (MSAS) in Japan, European Geostationary Navigation Overlay Service (EGNOS) in Europe, GPS Aided Geo Augmented Navigation (GAGAN) in India and other SBAS systems, and local DGPS systems, Canada CDGPS system, and India GAGAN systems. Other code based augmentation systems may be developed and implemented. Current phase based augmentation system includes but are not limited to StarFire™, Omnistar™, IGS precise products, JPL real-time corrections and CORS systems. Other phase based augmentation systems may be developed and implemented.

Phase or code corrections may be transmitted by geostationary satellite (10(3) broadcasting a correction signal (1(3), or by Internet server (105) through Internet message (1(5), or by a ground-based line of sight radio (107) broadcasting message (17).

In the case of WAAS, a network of wide area ground reference stations (WRSs) are linked to cover a service area including the entire U.S. and some areas of Canada and Mexico. The number of WRSs is currently about thirty-eight. The WRSs are precisely surveyed so that the exact location of each WRS is known. Signals from GPS satellites are received and analyzed by the WRSs to determine errors in the signals, including errors caused by the ionospheric disturbances described above. Each WRS in the network relays its data to a wide area master station (WMS) where correction information is computed. The WMS calculates correction messages for each GPS satellite based on correction algorithms and assesses the overall integrity of the system. The correction messages are then uplinked to a pair of Geostationary Communication Satellites (GEOs) via a ground uplink system. The GEOs broadcast the messages on the same frequency as GPS (L1, 1575.42 MHz) to GPS receivers within the coverage area of the WAAS satellites. The GEOs are also referred to by those skilled in the art as SBAS or WAAS satellites.

The code corrections can include several types of error corrections, including fast corrections, slow corrections and ionospheric corrections. The fast corrections are used to correct for rapidly changing errors such as the fast-varying component of the clock errors in the clocks of the satellites. The slow corrections are used to correct the slow-varying orbit errors as well as the slow-varying component of the clock errors in the clocks of the satellites.

The code correction is received in a message from a SBAS satellite, or a GBAS station. Data included in code correction messages includes mask data and correction data.

One type of information that is included in the correction messages is ionospheric correction data. Ionospheric corrections are broadcast for selected ionospheric grid points generally spaced at 5 degree intervals in both latitude and longitude directions. GNSS receivers use the code correction to correct for GPS satellite signal errors caused by ionospheric disturbances and other inaccuracies.

A system and method for applying code corrections is described in Applicant's co-pending U.S. patent application Ser. No. 12/340,119, filed on Dec. 18, 2008, the contents of which are incorporated herein, where permitted.

Once a GNSS receiver (150) receives GNSS measurements (11), new measurements can be created by combining different frequency measurements to form ionosphere free (IF) code pseudorange and IF carrier phase measurements, combining code and phase measurements to form IF code phase measurements (IFCP) and smoothed code measurements, differencing measurements from different GNSS satellites (101) or differencing measurements from different measurement epochs. All these original and created measurements may be corrected by the augmentation corrections received through a correction message (13, 15 and/or 17) before position determination. The original measurements, which have not been combined or differenced from any other measurements, are referred to herein as direct measurements herein.

In one embodiment, the invention comprises a method for approximating a position using a GNSS system having a plurality of GNSS satellites and one or more augmentation systems, the method comprising: (a) obtaining a direct code or a direct phase measurement, or both, from the GNSS satellite signals; (b) generating a code measurement group by creating at least one code-based additional measurement; (c) generating a phase measurement group by creating at least one phase-based additional measurement; (d) generating an IFCP measurement group by creating at least one IFCP measurement; (e) receiving at least one code correction from a code based augmentation system or at least one phase correction from a phase based augmentation system, or both; (f) correcting:

a. at least one measurement from the code measurement group with a code correction or a phase correction, or both, to produce a pure code (PC) measurement group, or a mixed code (MC) measurement group, respectively, or b. at least one measurement from the phase measurement group with a phase correction or a code correction, or both, to create a pure phase (PP) measurement group, or a mixed phase (MP) measurement group, respectively, or c. at least one IFCP measurement with a phase correction or a code correction, or both, to produce a pure code phase (PCP) measurement group, or a mixed code phase (MCP) measurement group;

(g) combining at least two different measurements selected from the PC, MC, PP, MP, PCP and MCP groups created in step (f) into code-dominated combinations and phase-dominated measurement combinations; and (h) using a code-dominated combination in a filter which outputs a position and ambiguity estimate; and repeating steps (a)-(h) until a stable filter output is achieved. Once a stable filter output is achieved, in one embodiment, a phase-dominated measurement combination may be used in the filter.

In one embodiment, step (j) may optionally be omitted where step (h) may utilize any measurement combination except a single frequency combination combining a MC and a PP measurement, and steps (a) to (i) are repeated regardless of the filter status. In another embodiment, optionally steps (h) and (i) are omitted and a phase dominated combination is used in the filter, where step (h) may utilize any measurement combination except a dual frequency combination combining pure IF phase plus pure IFCP measurement, or mixed IF code plus pure IF phase measurement.

As used herein, a "pure measurement" is a measurement which has been corrected by the correction developed for that particular measurement type. A "mixed measurement" is a measurement which has been corrected by a correction not purposely designed for it.

In another embodiment, the step (h) comprising two sub steps as code-dominated combination followed by phase-dominated combination, in a filter which outputs a position and ambiguity estimate.

In another embodiment, there could be no code and/or phase corrections and the system will treat the absent corrections as zeros.

Figure 2:
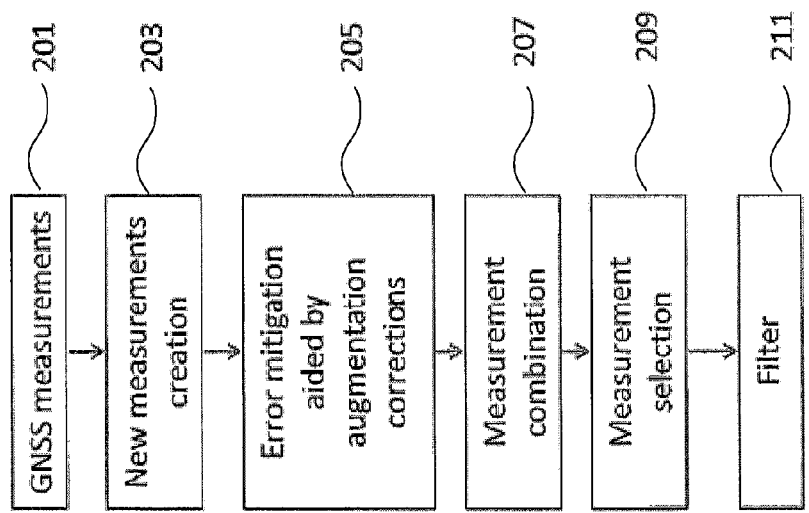
FIG. 2 is a schematic flowchart showing a basic method of implementing the present invention.

FIG. 2 shows a basic flowchart of one embodiment of the present invention. Direct GNSS measurements (11) from satellites (101) are received in step 201 and are then used to create additional measurements in step 203 based on the direct measurements (11). All of the direct and created additional measurements are corrected with the aid of either code corrections or phase corrections in step 205 to create two or more corrected measurements. These corrected measurements will then be grouped into different combinations in step 207. One combination will then be selected for position determination based on the condition of a filter in step 209 and the position will be determined by a filtering step (step 211). These steps may be repeated on a periodic basis in order to update the receiver position, or to refine the accuracy of the receiver position.

In one embodiment, the order of different steps in FIG. 2 may be varied. For example, measurement combinations (step 207) may be made ahead of the error mitigation step (205).

Figure 3:
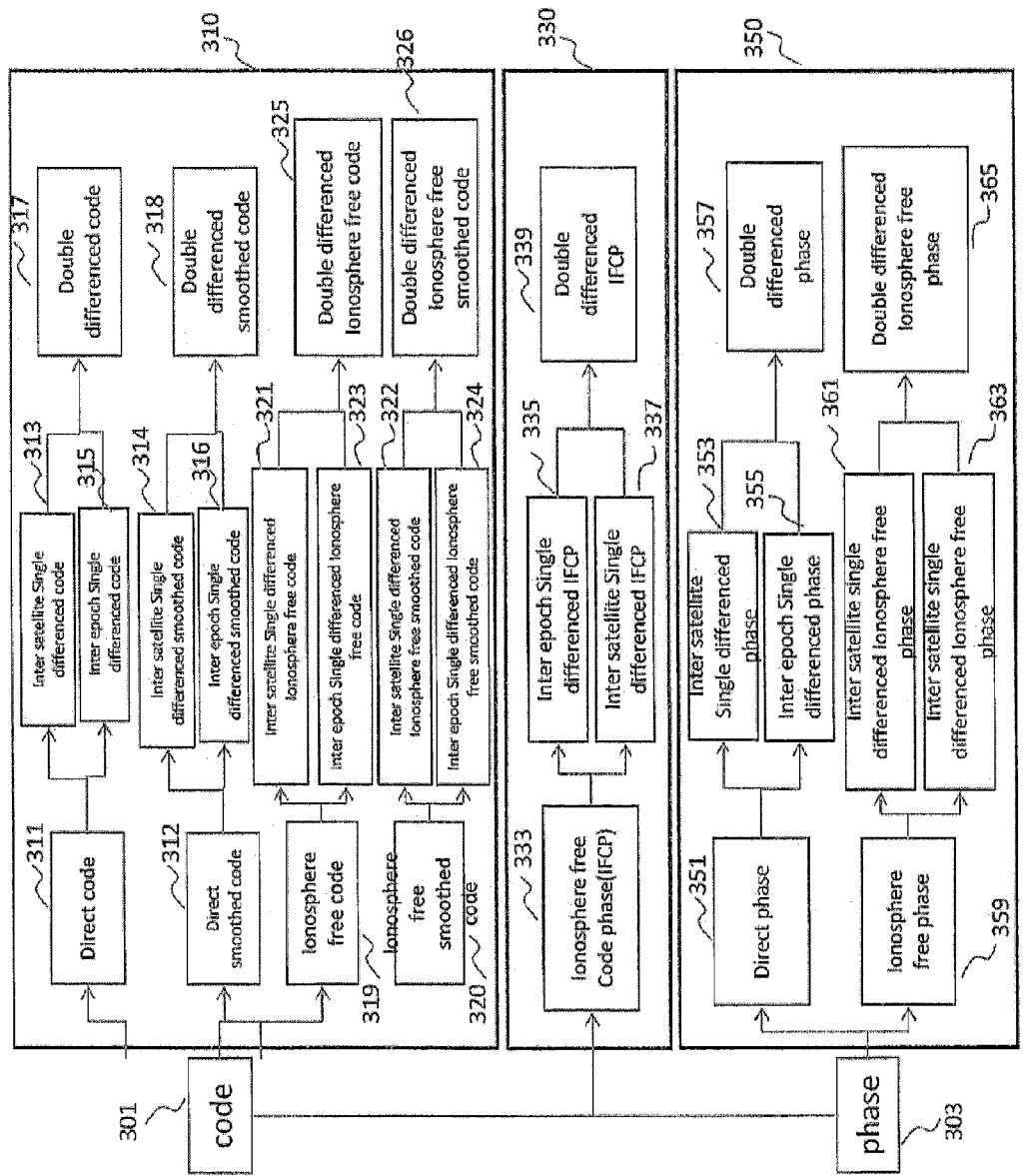
FIG. 3 is a representative illustration showing the method and procedure of new measurements creation.

FIG. 3 illustrates schematically one embodiment of the method and strategy of measurement creation. The direct measurements for a GNSS receiver (150) include initial code (301) and initial phase (303) measurements. The code (301) measurement can either be directly used for positioning, referred to as direct code (311) or be smoothed with carrier phase measurements to form smoothed code (312). The following equation shows an example of this smoothing process:

$$\rho(t_i)_{sm} = \frac{\rho(t_i) + (k-1) \times [\rho(t_{i-1})_{sm} + \phi_i - \phi_{i-1}]}{k} \quad (1)$$

where:
$\rho(t_i)_{sm}$ is the smoothed code pseudorange at time $t_i$
$\rho(t_i)$ is the code pseudorange measurement at time $t_i$
$\rho(t_{i-1})_{sm}$ is the smoothed code pseudorange from the prior epoch
$\phi_i$ is the instantaneous carrier phase measurement at time $t_i$
$\phi_{i-1}$ is the instantaneous carrier phase measurement from the prior epoch; and
k is a weighting factor, with larger values indicating a greater amount of smoothing when multiple frequency measurements are available, code (301) can be also be made as ionosphere free code measurements with both direct and smooth code measurements to form ionosphere free code (319) and ionosphere free smoothed code (320), for example, by the following equation:

$$P_{Ionosphere\ Free} = \frac{f_1^2 P_1 - f_2^2 P_2}{f_1^2 - f_2^2} \quad (2)$$

A phase measurement (303) can either be directly used for positioning, referred to as direct phase (351) or be made as ionosphere free combination, referred to as ionosphere free phase (359), as long as multiple frequency measurement is available, by the following equation:

$$\phi_{Ionosphere\ Free} = \frac{f_1^2 \phi_1 - f_2^2 \phi_2}{f_1^2 - f_2^2} \quad (3)$$

An Ionosphere Free Code Phase (IFCP) measurement (333) can be generated by combining code (301) and phase (303) as the following equation:

$$IFCP = \frac{P + \phi}{2} \quad (4)$$

As shown schematically in FIG. 3, additional new code measurements can be created as follows:
  inter-satellite single differenced code (313) can be generated by inter-satellite differencing direct code (311)
  inter-satellite single differenced smoothed code (314) can be generated by inter-satellite differencing smoothed code (312)
  inter-epoch single differenced code (315) can be generated by inter-epoch differencing direct code (311)
  inter-epoch single differenced smoothed code (316) can be generated by inter-epoch differencing smoothed code (312)
  inter-satellite inter-epoch double differenced code (317) can be generated by inter-satellite inter-epoch double differencing direct code (311)
  inter-satellite inter-epoch double differenced smoothed code (318) can be generated by inter-satellite inter-epoch double differencing smoothed code (312)
  inter-satellite single differenced ionosphere free code (321) can be generated by inter-epoch differencing ionosphere free code (319)
  inter-satellite single differenced ionosphere free smoothed code (322) can be generated by inter-epoch differencing ionosphere free smoothed code (320)
  inter-epoch single differenced ionosphere free code (323) can be generated by inter-epoch differencing ionosphere free code (319)
  inter-epoch single differenced ionosphere free smoothed code (324) can be generated by inter-epoch differencing ionosphere free smoothed code (320)
  inter-satellite, inter-epoch double differenced ionosphere free code (325) can be generated by inter-satellite inter-epoch double differencing ionosphere free code (319)
  inter-satellite, inter-epoch double differenced ionosphere free smoothed code (326) can be generated by inter-satellite inter-epoch double differencing ionosphere free smoothed code (320).

All such measurements generated from code measurement are referred to herein as the code measurement group (310).

Additional new IFCP measurements can be created as follows:
  inter-satellite single differenced IFCP (335) can be generated by inter-satellite differencing IFCP (333)
  as inter-epoch single differenced IFCP (337) be generated by inter-epoch differencing IFCP (333)
  inter-satellite, inter-epoch double differenced IFCP (339) can be generated by inter-satellite inter-epoch double differencing IFCP (333)

All such measurements generated from IFCP (333, 335, 337 and 339) are referred to herein as the IFCP measurement group (330).

Additional new phase measurements can be created as follows:
- inter-satellite single differenced phase (353) can be generated by inter-satellite differencing direct phase (351)
- inter-epoch single differenced phase (355) can be generated by inter-epoch differencing direct phase (351)
- inter-satellite, inter-epoch double differenced phase (357) can be generated by inter-satellite inter-epoch double differencing direct phase (351)
- inter-satellite single differenced ionosphere free phase (361) can be generated by inter-epoch differencing ionosphere free phase (359)
- inter-epoch single differenced ionosphere free phase (363) can be generated by inter-epoch differencing ionosphere free phase (359
- inter-satellite, inter-epoch double differenced ionosphere free phase (365 can be generated by inter-satellite inter-epoch double differencing ionosphere free phase (359)

All such phase measurements generated from phase measurement (303) will be referred to as phase measurement group (350).

Figure 4:
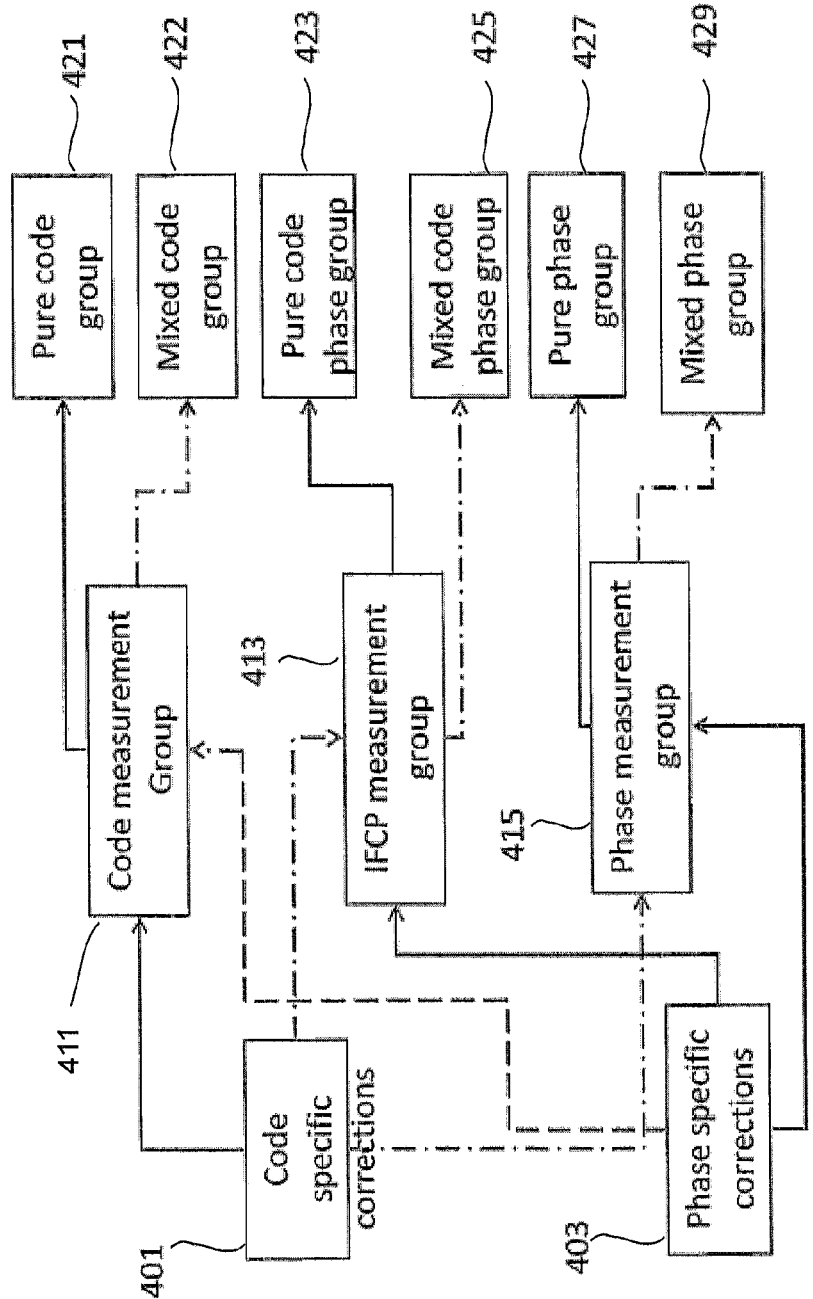
FIG. 4 is a representative illustration showing the method and procedure of error mitigation with the aid of augmentation corrections.

FIG. 4 illustrates one embodiment of an error correction strategy for different measurements. Errors or corrections common to both code and phase measurements, including but not limited to troposphere delay, ionosphere delay, Sagnac effect, relativity effect, and earth tide compensation, are not listed here, but may be implemented by those skilled in the art. Also, errors different for code and phase but which could be modeled by those skilled in the art, including but not limited to phase windup for carrier phase measurements, are also not listed here. The method illustrated in FIG. 4 only demonstrates error corrections specific to code or phase measurements. Code measurement group (310) is equivalent to code measurement group (411). IFCP measurement group (330) is equivalent to IFCP measurement group (413). Phase measurement group (350) is equivalent to phase measurement group (415).

After common and modeled corrections, code measurement group (411) can be corrected by code specific corrections (401) from code based augmentation systems to generate pure code group (421), which includes measurements such as:
- Pure Direct Code (PDC)
- Pure inter-Satellite Single Differenced Code (PSSDC)
- Pure inter-Epoch Single Differenced Code (PESDC)
- Pure inter-Satellite Inter-Epoch Double Differenced Code (PSEDDC)
- Pure Smoothed Code (PSC)
- Pure inter-Satellite Single Differenced Smoothed Code (PSSDSC)
- Pure inter-Epoch Single Differenced Smoothed Code (PESDSC)
- Pure inter-Satellite Inter-Epoch Double Differenced Smoothed Code (PSEDDSC)
- Pure Ionosphere free Code (PIC)
- Pure inter-Satellite Single Differenced Ionosphere free Code (PSSDIC)
- Pure inter-Epoch Single Differenced Ionosphere free Code (PESDIC)
- Pure inter-Satellite inter-Epoch Double Differenced Ionosphere free Code (PSEDDIC)
- Pure Ionosphere free Smoothed Code (PISC) Pure inter-Satellite Single Differenced Ionosphere free Smoothed Code (PSSDISC)
- Pure inter-Epoch Single Differenced Ionosphere free Smoothed Code (PESDISC)
- Pure inter-Satellite inter-Epoch Double Differenced Ionosphere free Smoothed Code (PSEDDISC)

The pure code measurement group is designated as "PC" and any measurement in this group is designated "P*C", where the asterisk indicates letter(s) which determine the specific pure code measurement.

Code measurement group (411) can also be corrected by phase specific corrections (403) from phase based augmentation systems to generate a mixed code measurement group (422), which includes measurements such as:
- Mixed Direct Code (MDC)
- Mixed inter-Satellite Single Differenced Code (MSSDC)
- Mixed inter-Epoch Single Differenced Code (MESDC)
- Mixed inter-Satellite inter-Epoch Double Differenced Code (MSEDDC)
- Mixed Smoothed Code (MSC)
- Mixed inter-Satellite Single Differenced Smoothed Code (MSSDSC)
- Mixed inter-Epoch Single Differenced Smoothed Code (MESDSC)
- Mixed inter-Satellite inter-Epoch Double Differenced Smoothed Code (MSEDDSC)
- Mixed Ionosphere free Code (MIC)
- Mixed inter-Satellite Single Differenced Ionosphere free Code (MSSDIC)
- Mixed inter-Epoch Single Differenced Ionosphere free Code (MESDIC)
- Mixed inter-Satellite inter-Epoch Double Differenced Ionosphere free Code (MSEDDIC)
- Mixed Ionosphere free Smoothed Code (MISC)
- Mixed inter-Satellite Single Differenced Ionosphere free Smoothed Code (MSSDISC)
- Mixed inter-Epoch Single Differenced Ionosphere free Smoothed Code (MESDISC)
- Mixed inter-Satellite inter-Epoch Double Differenced Ionosphere free Smoothed Code (MSEDDISC)

The mixed code measurement group (422) is designated as "MC" and any measurement in this group is designated as "M*C", where the asterisk indicates letter(s) which determine the specific mixed code measurement.

After common and modeled corrections, IFCP measurement group (413) can be corrected by phase specific corrections (403) from phase based augmentation systems to generate a pure code phase measurement group (423), which includes measurements such as:
- Pure Code Phase (PCP)
- Pure inter-Satellite Single Differenced Code Phase (PSSDCP)
- Pure inter-Epoch Single Differenced Code Phase (PESDCP)
- Pure inter-Satellite inter-Epoch Double Differenced Code Phase (PSEDDCP)

The pure code phase measurement group (423) is designated as "PCP" and any measurement in this group is designated as "P*CP", where the asterisk indicates letter(s) which determine the specific pure code phase measurement.

IFCP measurement group (413) can also be corrected by code specific corrections 401 from code based augmentation systems to generate a mixed code phase measurement group (425), which includes measurements such as:
- Mixed Code Phase (MCP)
- Mixed inter-Satellite Single Differenced Code Phase (MSSDCP)
- Mixed inter-Epoch Single Differenced Code Phase (MESDCP)

Mixed inter-Satellite inter-Epoch Double Differenced Code Phase (MSEDDCP)

The mixed code phase measurement group (425) is designated as "MCP" and any measurement in the group is designated as "M*CP", where the asterisk indicates letter(s) which determine the specific mixed code phase measurement.

After common and modeled corrections, phase measurement group (415) can be corrected by phase specific corrections (403) from phase based augmentation systems to generate a pure phase measurement group (427), which includes measurements such as:

Pure Direct Phase (PDP)
Pure inter-Satellite Single Differenced Phase (PSSDP)
Pure inter-Epoch Single Differenced Phase (PESDP)
Pure inter-Satellite inter-Epoch Double Differenced Phase (PSEDDP)
Pure Ionosphere free Phase (PIP)
Pure inter-Satellite Single Differenced Ionosphere free Phase (PSSDIP)
Pure inter-Epoch Single Differenced Ionosphere free Phase (PESDIP)
Pure inter-Satellite inter-Epoch Double Differenced Ionosphere free Phase (PSEDDIP)

The pure phase measurement group (427) is designated as "PP" and any measurement in this group is designated as "P*P", where the asterisk indicates letter(s) which determine the specific pure phase measurement.

Phase measurement group (415) can also be corrected by code specific corrections (401) from code based augmentation systems to generate a mixed phase measurement group (429), which includes measurements such as:

Mixed Direct Phase (MDP)
Mixed inter-Satellite Single Differenced Phase (MSSDP)
Mixed inter-Epoch Single Differenced Phase (MESDP)
Mixed inter-Satellite inter-Epoch Double Differenced Phase (MSEDDP)
Mixed Ionosphere free Phase (MIP)
Mixed inter-Satellite Single Differenced Ionosphere free Phase (MSSDIP)
Mixed inter-Epoch Single Differenced Ionosphere free Phase (MESDIP)
Mixed inter-Satellite inter-Epoch Double Differenced Ionosphere free Phase (MSEDDIP)

The mixed phase measurement group (429) is designated as "MP" and any measurement in this group is designated as "M*P", where the asterisk indicates letter(s) which determine the specific mixed phase measurement.

Figure 5:
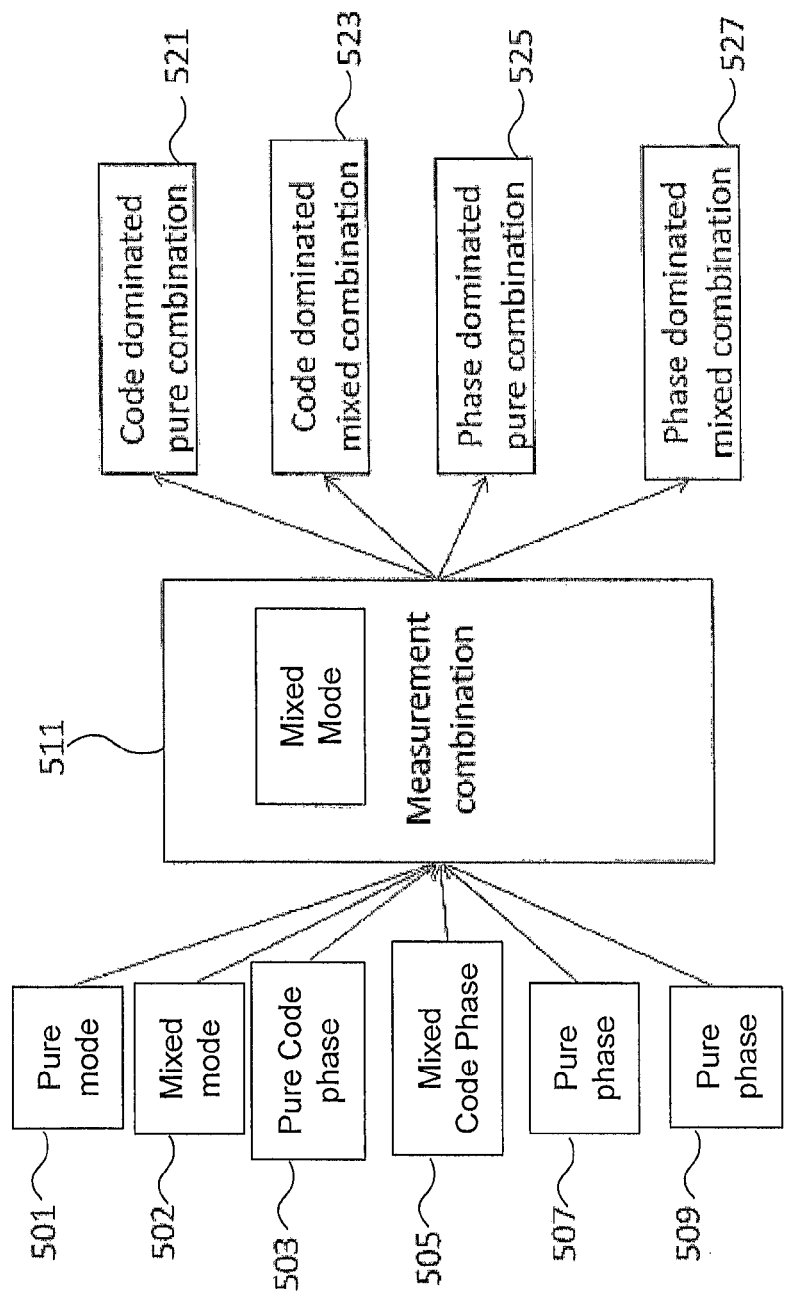
FIG. 5 is a representative illustration showing the method and procedure of generating measurement combinations.

FIG. 5 illustrates one embodiment of a procedure for creating a measurement combination. The measurement groups shown in FIG. 5 are equivalent to those shown in FIG. 4. (pure code group 421 is equivalent to 501; pure code phase group 423 is equivalent to 503; pure phase group 427 is equivalent to 507; mixed code group 422 is equivalent to 502; mixed code phase group 425 is equivalent to 505; mixed phase group 429 is equivalent to 509. The selection of measurements from the different measurement groups determines whether the measurement combination is code-dominated or phase-dominated and whether the measurement combination is pure or mixed.

A code-dominated pure combination (521) is formed when one measurement from pure code group (501) plus at least one measurement from pure code phase group (503) and pure phase group (507) are combined together to form one of a number of possible code-dominated pure combinations. Table 1 provides exemplary possible code-dominated pure combinations with single frequency systems:

TABLE 1

| | |
|---|---|
| Direct code-dominated pure | PDC plus one or more of PDP and PCP |
| Smoothed code-dominated pure | PSC plus one or more of PDP, PDC and PCP |
| Inter-Satellite single differenced code-dominated pure | PSSDC plus one or more of PSSDP and PSSDCP |
| Inter-Satellite single differenced smoothed code-dominated pure | PSSDSC plus one or more of PSSDP, PSSDC and PSSDCP |
| Inter-Epoch single differenced code-dominated pure | PESDC plus one or more of PESDP and PESDCP |
| Inter-Epoch single differenced smoothed code-dominated pure | PESDSC plus one or more of PESDP, PESDC and PESDCP |
| Inter-satellite inter-epoch double differenced code-dominated pure | PSEDDC plus one or more of PSEDDP and PSEDDCP |
| Inter-satellite inter-epoch double differenced smoothed code-dominated pure | PSEDDSC plus one or more of PSEDDP, PSEDDC and PSEDDCP |

For multiple frequency systems, the code-dominated pure combination (521) includes those of the single frequency measurements and also the measurements shown in Table 2.

TABLE 2

| | |
|---|---|
| Direct code-dominated pure | PDC plus PIP |
| | PDC plus PIP plus one or more of PIC, PISC, PCP and PDP |
| Smoothed code-dominated pure | PSC plus PIP |
| | PSC plus PIP plus one or more of PIC, PISC, PCP, PDC and PDP |
| Inter-Satellite single differenced code-dominated pure | PSSDC plus PSSDIP |
| | PSSDC plus PSSDIP plus one or more of PSSDIC, PSSDISC, PSSDDP and PSSDCP |
| Inter-Satellite single differenced smoothed code-dominated pure | PSSDSC plus PSSDIP |
| | PSSDSC plus PSSDIP plus one or more of PSSDIC, PSSDISC, PSSDDP, PSSDC and PSSDCP |
| Inter-Epoch single differenced code-dominated pure | PESDC plus PESDIP |
| | PESDC plus PESDIP plus one or more of PESDIC, PESDISC, PESDDP and PESDCP |
| Inter-Epoch single differenced smoothed code-dominated pure | PESDSC plus PESDIP |
| | PESDSC plus PESDIP plus one or more of PESDIC, PESDISC, PESDDP, PESDC and PESDCP |
| Inter-satellite inter-epoch double differenced code-dominated pure | PSEDDC plus PSEDDIP |
| | PSEDDC plus PSEDDIP plus one or more of PSEDDIC, PSEDDISC, PDDDP and PSEDDCP |
| Inter-satellite inter-epoch double differenced smoothed code-dominated pure | PSEDDSC plus PSEDDIP |
| | PSEDDSC plus PSEDDIP plus one or more of PSEDDIC, PSEDDISC, PDDDP, PESDSC and PSEDDCP |

Code-dominated mixed measurement combinations (523) are formed when one measurement from pure code group (501) or mixed code group (502) plus at least one measurement from pure code phase group (503), pure phase group (507), mixed code phase (505) and mixed phase group (509) are combined together, and at least one of the measurements used is mixed. Table 3 provides possible code-dominated mixed combinations with single frequency measurements:

TABLE 3

| | |
|---|---|
| Direct code-dominated mixed | MDC/PDC plus one or more of PCP, PDP, MCP and MDP with at least one mixed measurement used |
| Smooth code-dominated mixed | MSC/PSC plus one or more of PCP, PDP, MCP, MDC, PDC and MDP with at least one mixed measurement used |
| Inter-Satellite single differenced code-dominated mixed | MSSDC/PSSDC plus one or more of PSSDP, PSSDCP, MSSDP and MSSDCP with at least one mixed measurement |

TABLE 3-continued

| | |
|---|---|
| | used |
| Inter-Satellite single differenced smoothed code-dominated mixed | MSSDSC/PSSDSC plus one or more of PSSDP, PSSDCP, MSSDP, MSSDC, PSSDC and MSSDCP with at least one mixed measurement used |
| Inter-Epoch single differenced code-dominated mixed | MESDC/PESDC plus one or more of PESDP, PESDCP, MESDP and MESDCP with at least one mixed measurement used |
| Inter-Epoch single differenced smoothed code-dominated mixed | MESDSC/PESDSC plus one or more of PESDP, PESDCP, MESDP, MESDC, PESDC and MESDCP with at least one mixed measurement used |
| Inter-satellite inter-epoch double differenced code-dominated pure | MSEDDC/PSEDDC plus one or more of PSEDDP, PSEDDCP, MSEDDP and MSEDDCP with at least one mixed measurement used |
| Inter-satellite inter-epoch double differenced smoothed code-dominated pure | MSEDDSC/PSEDDSC plus one or more of PSEDDP, PSEDDCP, MSEDDP, MSEDDC, PSEDDC and MSEDDCP with at least one mixed measurement used |

For multiple frequency systems, code-dominated mixed measurement combination (523) includes those of the single frequency measurements and also the measurements shown in Table 4.

TABLE 4

| | |
|---|---|
| Direct code-dominated mixed | MDC/PDC plus MIP/PIP<br>MDC/PDC plus MIP/PIP plus one or more of PIC, PCP, PDP, MIC, MCP and MDP<br>With at least one mixed measurement used |
| Smoothed code-dominated mixed | MSC/PSC plus MIP/PIP<br>MSC/PSC plus MIP/PIP plus one or more of PIC, PISC, PCP, PDP, MIC, MISC, MCP, MDC, PDC and MDP<br>With at least one mixed measurement used |
| Inter-Satellite single differenced code-dominated pure | MSSDC/PSSDC plus MSSDIP/PSSDIP<br>MSSDC/PSSDC plus MSSDIP/PSSDIP plus one or more of PSSDIC, PSSDDP, PSSDCP, MSSDIC, MSSDDP and MSSDCP<br>With at least one mixed measurement used |
| Inter-Satellite single differenced smoothed code-dominated pure | MSSDSC/PSSDSC plus MSSDIP/PSSDIP<br>MSSDSC/MSSDSC plus MSSDIP/PSSDIP plus one or more of PSSDIC, PSSDISC, PSSDDP, PSSDCP, MSSDIC, MSSDISC, MSSDDP, MSSDC, PSSDC and MSSDCP<br>With at least one mixed measurement used |
| Inter-Epoch single differenced code-dominated pure | MESDC/PESDC plus MESDIP/PESDIP<br>MESDC/PESDC plus MESDI/PESDIP plus one or more of PESDIC, PESDDP, PESDCP, MESDIC, MESDDP and MESDCP<br>With at least one mixed measurement used |
| Inter-Epoch single differenced smoothed code-dominated pure | MESDSC/PESDSC plus MESDIP/PESDIP<br>MESDSC/PESDSC plus MESDIP/PESDIP plus one or more of PESDIC, PESDISC, PESDDP, PESDCP, MESDIC, MESDISC, MESDDP, MESDC, PESDC and MESDCP<br>With at least one mixed measurement used |
| Inter-satellite inter-epoch double differenced code-dominated pure | MSEDDC/PSEDDC plus MSEDDIP/PSEDDIP<br>MSEDDC/PSEDDC plus MSEDDIP/PSEDDIP plus one or more of PSEDDIC, PSEDDP, PSEDDCP, MSEDDIC, MSEDDP and MSEDDCP<br>With at least one mixed measurement used |
| Inter-satellite inter-epoch double differenced smoothed code-dominated pure | MSEDDSC/PSEDDSC plus MSEDDIP/PSEDDIP<br>MSEDDSC/PSEDDSC plus MSEDDIP/PSEDDIP plus one or more of PSEDDIC, PSEDDISC, PSEDDP, PSEDDCP, MSEDDIC, MSEDDISC, MSEDDP, MSEDDC, PSEDDC and MSEDDCP<br>With at least one mixed measurement used |

One or more measurements from pure code phase group (503) and pure phase group (507) and ionosphere free code measurements from pure code group (501 are used to develop the phase-dominated pure combination (525). Table 5 provides possible phase-dominated pure combinations with single frequency measurements:

TABLE 5

| | |
|---|---|
| Direct phase-dominated pure | One or more of PDP and PCP |
| Inter-satellite single differenced phase-dominated pure | One or more of PSSDP and PSSDCP |
| Inter-epoch single differenced phase-dominated pure | One or more of PESDP and PESDCP |
| Inter-satellite inter-epoch double differenced phase-dominated pure | One or more of PSEDDP and PDDCP |

For multiple frequency systems, a phase-dominated pure combination (525) includes those of the single frequency measurements and also the measurements shown in Table 6.

TABLE 6

| | |
|---|---|
| Direct phase-dominated pure | PIP<br>PIP plus one or more of PIC, PISC, PCP and PDP |
| Inter-satellite single differenced phase-dominated pure | PSSDIP<br>PSSDIP plus one or more of PSSDIC, PSSDISC, PSSDCP, PSSDDP |
| Inter-epoch single differenced phase-dominated pure | PESDIP<br>PESDIP plus one or more of PESDIC, PESDISC, PESDCP and PESDDP |
| Inter-satellite inter-epoch double differenced phase-dominated pure | PSEDDIP<br>PSEDDIP plus one or more of PSEDDIC, PSEDDISC, PSEDDCP, PSEDDP |

One or more of pure code phase group (503), mixed code phase group (505), pure phase group (507), mixed phase group (509) and ionosphere free code measurements from pure code group (501 or mixed code group (502) are used to develop phase-dominated mixed combination (527). Table 7 provides possible phase-dominated mixed combinations with single frequency measurements.

TABLE 7

| | |
|---|---|
| Direct phase-dominated mixed | One or more of MDP/PDP and MCP and PCP with at least one mixed measurement used |
| Inter-satellite single differenced phase-dominated mixed | One or more of MSSDP, PSSDP, MSSDCP and PSSDCP with at least one mixed measurement used |
| Inter-epoch single differenced phase-dominated mixed | One or more of MESDP/PESDP and MESDCP and PESDCP with at least one mixed measurement used |
| Inter-satellite inter-epoch double differenced phase-dominated mixed | One or more of MSEDDP/PSEDDP and MSEDDCP and PSEDDCP with at least one mixed measurement used |

For multiple frequency systems, phase-dominated mixed combination (527) includes those of the single frequency measurements and also the measurements shown in Table 8.

TABLE 8

| | |
|---|---|
| Direct phase-dominated mixed | MIP<br>MIP/PIP plus one or more of PCP, PIC, PISC, PDP, MIC, MISC and MDP<br>With at least one mixed measurement used |
| Inter-satellite single differenced phase-dominated mixed | MSSDIP<br>MSSDIP/PSSDIP plus one or more of PSSDCP, PSSDIC, PSSDP, MSSDCP, MSSDIC, MSSDISC, MSSDP<br>With at least one mixed measurement used |
| Inter-epoch single differenced phase-dominated mixed | MESDIP<br>MESDIP/PESDIP plus one or more of PESDCP, PESDIC, PESDISC, PESDP, MESDCP, |

TABLE 8-continued

| | |
|---|---|
| Inter-satellite inter-epoch double differenced phase-dominated mixed | MESDIC, MESDISC, MESDP<br>With at least one mixed measurement used<br>MSEDDIP<br>MSEDDIP/PSEDDIP plus one or more of<br>PESDCP, PESDIC, PESDISC, PESDP,<br>MESDCP, MESDIC, MESDISC, MESDP<br>With at least one mixed measurement used |

The present invention may also be described in the context of computer-executable instructions, such as program modules, being executed by a computer. Generally, program modules include routines, programs, objects, components, data structures, etc. that perform particular tasks or implement particular abstract data types.

The present invention can be realized in hardware, software, or a combination of hardware and software. The present invention can be realized in a centralized fashion in one data processing system such as a computer system, or in a distributed fashion where different elements are spread across several interconnected data processing systems. A typical combination of hardware and software could be a general purpose computer system or other data processing system with a computer program that, when being loaded and executed, controls the computer system such that it carries out the methods described herein.

Program instructions includes any expression, in any language, code or notation, of a set of instructions intended to cause a data processing system having an information processing capability to perform a particular function either directly or after conversion to another language, code or notation, and/or reproduction in a different material form.

The invention also includes an article of manufacture which comprises a computer readable memory having computer readable statements and instructions contained thereon for implementing one or more of the methods described above, using a data processing system.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A method for determining a position using a GNSS systems having a plurality of GNSS satellites and one or more augmentation systems, the method comprising the step of receiving signals transmitted by the GNSS satellites, and further comprising the sequential or non-sequential steps of:
   a) obtaining a direct code or a direct phase measurement, or both, from the GNSS satellite signals;
   b) generating a code measurement group by creating at least one code-based additional measurement;
   c) generating a phase measurement group by creating at least one phase-based additional measurement;
   d) generating an IFCP measurement group by creating at least one IFCP measurement;
   e) receiving at least one phase correction from a phase based augmentation system, and optionally, at least one code correction from a code based augmentation system;
   f) correcting one or more:
      a. at least one measurement from the code measurement group with a code correction to produce a pure code (PC) measurement group, or with a phase correction to produce a mixed code (MC) measurement group, or producing both a PC and a MC measurement group, or
      b. at least one measurement from the phase measurement group with a phase correction to create a pure phase (PP) measurement group, or with a code correction to create a mixed phase (MP) measurement group, or producing both a PP and a MP measurement group, or
      c. at least one IFCP measurement with a phase correction to produce a pure code phase (PCP) measurement group, or with a code correction to produce a mixed code phase (MCP) measurement group, or producing both a PCP measurement group and a MCP measurement group, or
      d. correct errors by error models;
   g) combining at least two different measurements selected from the measurement groups created in step (f) into code-dominated combinations and phase-dominated measurement combinations; and
   h) using one or more of a code-dominated combination in a filter which outputs a position and ambiguity estimate;
   i) repeating steps (a)-(h) until a stable filter output is achieved; and
   j) thereafter using one or more of a phase-dominated combination in the filter;
   wherein the code-dominated combinations comprise a code-dominated mixed combination, and optionally, a code-dominated pure combination; and wherein the code-dominated mixed combination comprises a measurement selected from the PC or MC measurement groups and at least one measurement from any of MP, PP, MCP or PCP groups, provided at least one measurement in the combination is selected from MC, MP, or MCP groups.

2. The method of claim 1 wherein step (j) is not reached, and steps (a) to (i) are repeated regardless of the filter status, except for using the single frequency combinations including mix direct code plus pure direct phase.

3. The method of claim 1 wherein steps (h) and (i) are skipped, and the method goes directly to step (j) from step (g), except for using dual frequency combinations including pure IF phase plus pure IFCP, and mixed IF code plus pure IF phase.

4. The method of claim 1 wherein the order of steps (b) to (f) may be varied, provided always that step (e) precedes step (f).

5. The method of claim 1 wherein the code-dominated pure combination comprises a measurement from the PC group and at least one other measurement selected from the PC, PP, or PCP groups.

6. The method of claim 5 wherein the code-dominated pure combination comprises a measurement combination of Table 1 for a single-frequency system, or Table 1 or 2 for a multiple frequency system.

7. The method of claim 1 wherein the code-dominated mixed combination comprises a measurement combination of Table 3 for a single-frequency system, or Table 3 or 4 for a multiple frequency system.

8. The method of claim 1 wherein the GNSS system comprises GPS, GLONASS, GALILEO, Beidou, or QZSS.

9. The method of claim 1 wherein the augmentation system is a satellite based augmentation system, ground based augmentation system, internet based augmentation system, or other augmentation systems providing code corrections only, phase corrections only, or both code and phase corrections.

10. The method of claim 1 wherein the code based augmentation system comprises the US Wide Area Augmentation System, the Japanese Multi functional Satellite Augmentation system, the European Geostationary Navigation Overlay Service, Canada CDGPS system, India GAGAN system, or local DGPS systems providing code corrections and the phase based augmentation system comprises StarFire system, OmniStar system, JPL system, or CORS systems providing phase corrections.

11. The method of claim 1 wherein no augmentation corrections are applied and are treated as zeros.

12. A method for determining a position using a GNSS systems having a plurality of GNSS satellites and one or more augmentation systems, the method comprising the step of receiving signals transmitted by the GNSS satellites, and further comprising the sequential or non-sequential steps of:
   a) obtaining a direct code or a direct phase measurement, or both, from the GNSS satellite signals;
   b) generating a code measurement group by creating at least one code-based additional measurement;
   c) generating a phase measurement group by creating at least one phase-based additional measurement;
   d) generating an IFCP measurement group by creating at least one IFCP measurement;
   e) receiving at least one phase correction from a phase based augmentation system, and optionally, one code correction from a code based augmentation system;
   f) correcting one or more:
      a. at least one measurement from the code measurement group with a code correction to produce a pure code (PC) measurement group, or with a phase correction to produce a mixed code (MC) measurement group, or producing both a PC and a MC measurement group, or
      b. at least one measurement from the phase measurement group with a phase correction to create a pure phase (PP) measurement group, or with a code correction to create a mixed phase (MP) measurement group, or producing both a PP and a MP measurement group, or
      c. at least one IFCP measurement with a phase correction to produce a pure code phase (PCP) measurement group, or with a code correction to produce a mixed code phase (MCP) measurement group, or producing both a PCP measurement group and a MCP measurement group, or
      d. correct errors by error models;
   g) combining at least two different measurements selected from the measurement groups created in step (f) into code-dominated combinations and phase-dominated measurement combinations; and
   h) using one or more of a code-dominated combination in a filter which outputs a position and ambiguity estimate;
   i) repeating steps (a)-(h) until a stable filter output is achieved; and
   j) thereafter using one or more of a phase-dominated combination in the filter;
   wherein the phase-dominated combinations comprise a phase-dominated pure combination, and, optionally, a phase-dominated mixed combination; and wherein the phase-dominated pure combination comprises a measurement from the PP group and at least one other measurement selected from the PP, PC or PCP groups.

13. The method of claim 12 wherein steps (h) and (i) are skipped, and the method goes directly to step (j) from step (g), except for using dual frequency combinations including pure IF phase plus pure IFCP, and mixed IF code plus pure IF phase.

14. The method of claim 12 wherein the order of steps (b) to (f) may be varied, provided always that step (e) precedes step (f).

15. The method of claim 12 wherein the phase-dominated mixed combination comprises a measurement selected from the PP or MP measurement groups and at least one measurement from any of MC, PCP or MCP groups, provided that at least one measurement in the combination is selected from MC, MP or MCP groups.

16. The method of claim 12 wherein the phase-dominated pure combination comprises a measurement combination of Table 5 for a single-frequency system or Table 5 or 6 for a multiple frequency system.

17. The method of claim 12 wherein the phase-dominated mixed measurement comprises a measurement combination of Table 7 for a single-frequency system, or Table 7 or 8 for a multiple frequency system.

18. The method of claim 12 wherein the GNSS system comprises GPS, GLONASS, GALILEO, Beidou, or QZSS.

19. The method of claim 12 wherein the augmentation system is a satellite based augmentation system, ground based augmentation system, internet based augmentation system or other augmentation systems providing code corrections only, phase corrections only, or both code and phase corrections.

20. The method of claim 12 wherein the code based augmentation system comprises the US Wide Area Augmentation System, the Japanese Multi functional Satellite Augmentation system, the European Geostationary Navigation Overlay Service, Canada CDGPS system, India GAGAN system, or local DGPS systems providing code corrections and the phase based augmentation system comprises StarFire system, OmniStar system, JPL system, or CORS systems providing phase corrections.

21. The method of claim 12 wherein no augmentation corrections are applied and are treated as zeros.

22. A method for determining a position using a GNSS systems having a plurality of GNSS satellites and one or more augmentation systems, the method comprising the step of receiving signals transmitted by the GNSS satellites, and further comprising the sequential or non-sequential steps of:
   a) obtaining a direct code or a direct phase measurement, or both, from the GNSS satellite signals;
   b) generating a code measurement group by creating at least one code-based additional measurement;
   c) generating a phase measurement group by creating at least one phase-based additional measurement;
   d) generating an IFCP measurement group by creating at least one IFCP measurement;
   e) receiving at least one code correction from a code based augmentation system;
   f) correcting one or more:

a. at least one measurement from the code measurement group with a code correction to produce a pure code (PC) measurement group, or
b. at least one measurement from the phase measurement group with a code correction to create a mixed phase (MP) measurement group, or
c. at least one IFCP measurement with a code correction to produce a mixed code phase (MCP) measurement group, or
d. correct errors by error models;

g) combining at least two different measurements selected from the measurement groups created in step (f) into code-dominated combinations and phase-dominated measurement combinations; and h) using one or more of a code-dominated combination in a filter which outputs a position and ambiguity estimate;

i) repeating steps (a)-(h) until a stable filter output is achieved; and j) thereafter using one or more of a phase-dominated combination in the filter;

wherein the code-dominated combinations comprise a code-dominated mixed combination comprising at least one differenced combination.

23. The method of claim 22 wherein step (j) is not reached, and steps (a) to (i) are repeated regardless of the filter status.

24. The method of claim 22 wherein steps (h) and (i) are skipped, and the method goes directly to step (j) from step (g).

25. The method of claim 22 wherein the order of steps (b) to (f) may be varied, provided always that step (e) precedes step (f).

26. The method of claim 22 wherein the code-dominated pure combination comprises a measurement combination of Table 1 for a single-frequency system, or Table 1 or 2 for a multiple frequency system.

27. The method of claim 22 wherein the phase-dominated mixed measurement comprises a measurement combination of Table 7 for a single-frequency system, or Table 7 or 8 for a multiple frequency system.

28. The method of claim 22 wherein the GNSS system comprises GPS, GLONASS, GALILEO, Beidou, or QZSS.

29. The method of claim 22 wherein the augmentation system is a satellite based augmentation system, ground based augmentation system, internet based augmentation system or other augmentation systems providing code corrections only, phase corrections only, or both code and phase corrections.

30. The method of claim 22 wherein the code based augmentation system comprises the US Wide Area Augmentation System, the Japanese Multi functional Satellite Augmentation system, the European Geostationary Navigation Overlay Service, Canada CDGPS system, India GAGAN system, or local DGPS systems providing code corrections and the phase based augmentation system comprises StarFire system, OmniStar system, JPL system, or CORS systems providing phase corrections.

31. The method of claim 22 wherein no augmentation corrections are applied and are treated as zeros.

* * * * *